L. JOHNS.
VEHICLE FOR CHILDREN.
APPLICATION FILED MAR. 26, 1920.
1,383,307. Patented July 5, 1921.
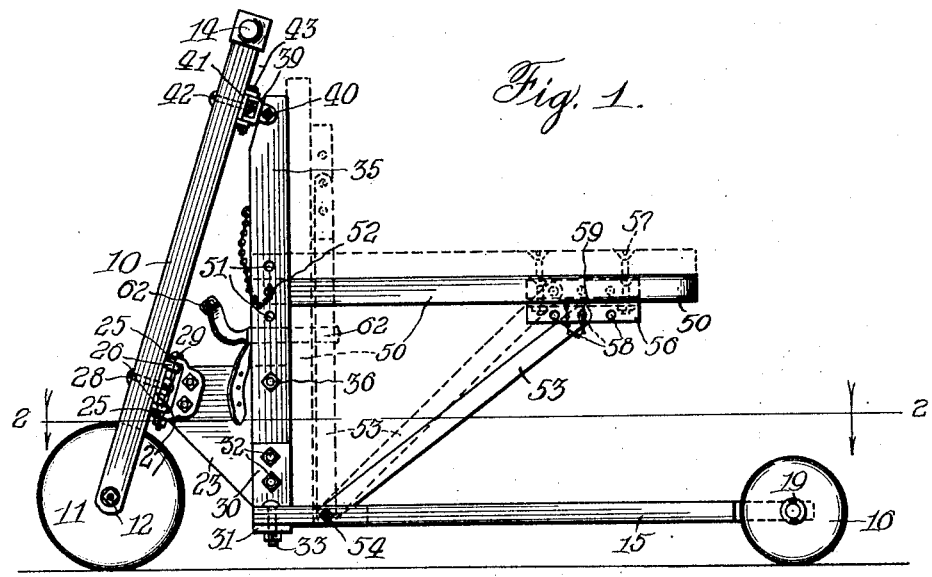
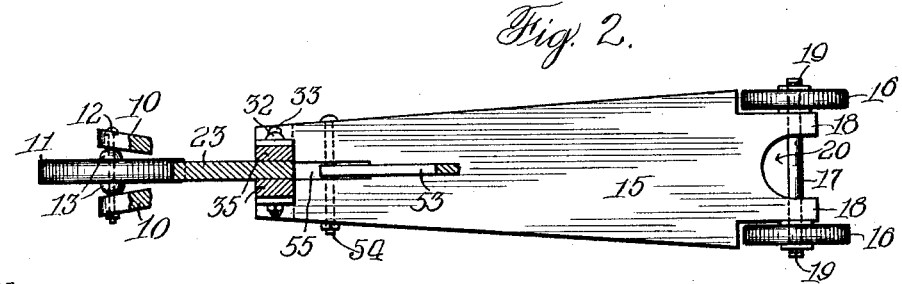
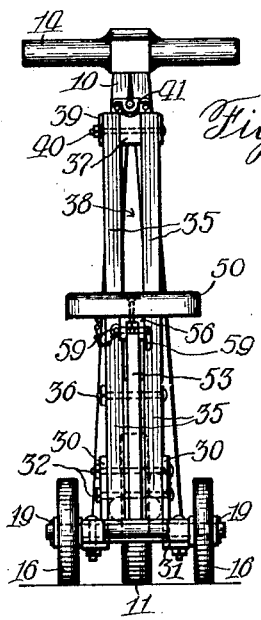
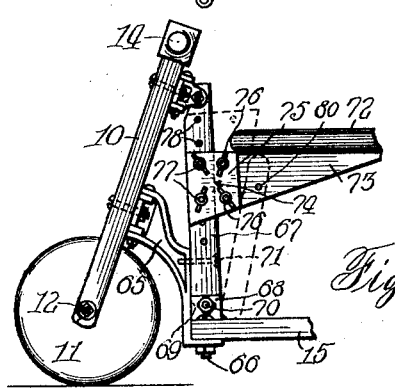
Inventor:
Luther Johns

UNITED STATES PATENT OFFICE.

LUTHER JOHNS, OF OAK PARK, ILLINOIS.

VEHICLE FOR CHILDREN.

1,383,307.  Specification of Letters Patent.  Patented July 5, 1921.

Application filed March 26, 1920. Serial No. 368,880.

*To all whom it may concern:*

Be it known that I, LUTHER JOHNS, a citizen of the United States, residing in the village of Oak Park, county of Cook, and State of Illinois, have invented certain new and useful Improvements in Vehicles for Children, of which the following is a specification.

My invention relates to vehicles in the nature of toys for use by children. Among its objects are the provision of a peculiarly strong and rigid structure, of few and simple parts, which may be shipped in unassembled condition and be readily assembled by almost anyone, and which is attractive in appearance. A further object is to provide a device which may readily be converted from one specific type of vehicle into another, thus avoiding the cost of two devices in some instances and in others providing the advantages of two devices where cost considerations prevent the purchase of but one. Other objects and advantages will appear hereinafter.

In the accompanying drawings, which form a part of this specification, Figure 1 is a side view of the vehicle complete according to the preferred form; Fig. 2 is a horizontal section, as on the line 2—2 of Fig. 1; Fig. 3 is a rear elevation; Fig. 4 is a fragment showing the seat device in top view and a section of its front-end holding means; and Fig. 5 is a fragmentary side view of a modified form of construction.

In devices of the present class there are two principal types. One of these is exemplified in a vehicle in which the child places one foot upon a low, substantially horizontal foot-support and, while holding the handle bar, pushes with his other foot upon the ground. The other type includes a seat upon which the child rests his body, steering being done by the hands, as in the other type of device, movement being accomplished by pushing with both feet upon the ground or other traction surface. These devices may be called foot vehicles and seat vehicles respectively.

The present improvements, in the form illustrated and equivalents thereof, provide for both of these utilities in a single structure having notable advantages of ease of operation, strength, safety in operation, appearance, and also in the mechanical exercise, training and interest to the child in converting the device from one type to the other.

Referring to the drawings, the illustrated device includes a steering post 10 which is shown as comprising a pair of bars diverging downwardly and having the wheel 11 mounted in the fork thus produced, as upon the bolt 12, a pair of spacers 13 maintaining the wheel medially between the forks. At the top of these steering post bars the handle bar 14 is secured, as by mortising the handle bar to receive the ends of the steering post bars and driving nails through these upright and transverse members. The steering post may be of any approved construction within the meaning of the improvements herein set forth.

The device illustrated consists further of an intermediate member having a foot-rest part 15, which is in the form of a wooden board and extends substantially horizontally to a single rear wheel if desired or the two wheels 16 shown. These wheels are held upon the board 15 by supporting means 17 consisting of a rod passed through holes in the end portions 18 of the board 15, washers preferably being placed on each side of the wheels respectively, cotter pins 19 holding the wheels in place. The board 15 is preferably recessed at 20 to provide the free ends 18 and to form a space for the child's foot or feet in some uses. The practice of holding a rear wheel or wheels in operative position in substantially this manner is well known in the art.

The intermediate member includes also a supporting or connecting piece 23, shown as of wooden board material in Figs. 1 to 3 inclusive. It may be about an inch thick and is preferably of good quality hardwood. It is pointed out that the foot rest 15 should be only several inches from the ground for comfortable and satisfactory operation, and the support or front extension 23 is therefore formed whereby the board 15 secured thereto may be at a considerable distance below the connection of the part 23 with the steering post and below the top of the front wheel where the front wheel is of more than several inches in diameter. The upper end of the support 23 is provided with a pair of jaws 25 interfitting with a similar pair of jaws 26 which are part of the bracket 27 secured as by bolts 28 upon the steering post. These interfitting jaw members 25 and 26 have up-and-down holes in alinement to accommodate the pin 29, shown as a bolt, thus forming a pivotal connection between the steering post and the intermediate member. These connection elements are shown as metal stampings and are of well known form in vehicles of this general class.

The foot-rest part 15 is rigidly held upon the support 23 by a pair of oppositely disposed L-shaped brackets having respectively an upwardly extending leg 30 and a horizontal leg 31, bolts 32 passing through the upright legs and bolts 33 passing through the foot rest and the horizontal legs respectively.

Extending upwardly and lying alongside of the supporting part 23 in Figs. 1, 2 and 3 is a seat supporting and frame element 35 comprising two bars, preferably of good quality hardwood, parallel with each other, reaching to a relatively great height above the foot-rest part, substantially meeting the rearwardly slanting steering post, and being secured rigidly to the part 23 by the bolts 32 and another bolt 36. At the top of these bars 35 is a spacing block 37, there being a way 38 provided between these bars. A pivotal connection element 39 having a pair of forwardly projecting jaws is secured to the bars 35 by a bolt 40. A coöperating pivotal connection element 41 held upon the steering post by bolts 42 has similar jaws, and a pin or bolt 43 passing through alining holes in these jaws completes a pivotal connection at the top of the bars 35 of the same kind as between the steering post and the part 23.

The construction thus far described exemplifies a device in which the child places a foot upon the foot rest 15 and pushes upon the ground with his other foot.

Since these pivotal connections between the steering post and the rest of the device are widely spaced apart and since the bars 35 are securely and rigidly held upon the intermediate members a peculiarly rigid structure as a whole is produced having notable advantages. For instance, the steering post may be turned on its pivotal connections very freely and without binding strains. Again, in a device of the foot vehicle type the child pushes and pulls hard upon the handle bars as he propels the device, due to the shifting of his weight, and the present construction is well adapted to withstand these racking strains and to maintain ease and freedom of steering. An important feature is the openness and absence of frame or reinforcing parts above the main body of the foot-rest part 15 while providing the desired strength and rigidity referred to. Another advantage is in the simplicity and small number of parts employed and their cheapness and availability for manufacturing purposes. A foot vehicle in accordance with the specific description thus far made would therefore have numerous important features of advantage.

My preferred form of device includes a seat 50 having its forward end projecting with an easy yet snug fit into the way 38 between the bars 35, several adjustment holes 51 being bored horizontally through both bars and a corresponding horizontal hole being bored through the front end of the seat member whereby a pin 52 may hold the front end of the seat at various elevations. The seat 50 is supported further by the bar 53 pivoted on the bolt 54, the front end of the member 15 being recessed at 55 to accommodate the lower end of the rod 53. On the under side of the seat 50 is the section of channel iron 56 secured to the seat by bolts 57, the channel having adjustment holes 58, the pin 59 holding the upper end of the rod 53 pivotally between the webs of the channel. When it is desired to adjust the height of the seat 50 the pins 52 and 59 are withdrawn and inserted in other of the adjustment holes respectively. This feature provides that the same device may be used as a seat vehicle by the same child at different ages or by several children of various sizes in the home.

The pins 52 and 59 respectively are shown as having a section thereof hinged to the main body so that after passing through the parts to be held the pivoted section may hang down and automatically lock the pin readily removably in place. A cotter pin is another form of self-locking device which would serve. Bolts may also be used, but where the children themselves would ordinarily make the adjustments a more easily operated form of pin is preferred, for instance the kind shown. Chains or cords attached to the pins and to an adjacent part of the device prevent the pins from becoming lost.

A highly important feature of the construction is that upon removing the pin 52 the front end of the seat 50 may be lowered upon the rod or bar 53 and these two members then swung forward on the bolt 54 as a pivot into their dotted line positions shown in Fig. 1, and be there held by any suitable means, as by a strap 62. The seat 50 and the standard 53 are thus carried into an out-of-the-way position, and the device is thus readily converted into a foot vehicle. Reversing these operations changes it back into a seat vehicle, and these modifications can be made in a few seconds of time.

The foot-rest part 15 is preferably tapered forwardly as shown so as to provide substantial width, say six or eight inches at the rear to give substantial spread to the rear wheels, where two rear wheels are used, while maintaining the more forward parts of the foot rest more narrow so as not to interfere with the operator's feet when the device is used as a seat vehicle. The rear wheels are preferably positioned in recesses formed in the rear side portions of the foot rest 15 as shown so that the operator's feet will not be run into by these wheels, and this protecting feature or guard also eases the device around articles of furniture or other objects which may be encountered.

In the modification of Fig. 5 the supporting element 65 is shown as a casting, and the foot rest is secured thereto by oppositely disposed bolts 66, one of which is shown. It has an integral part forming a pocket or recess for the single upright bracing and seat-supporting element 67, the pocket having oppositely disposed side walls at 68, one being shown, and a front wall at 69. A bolt 70 holds the member 67 between the side walls 68 and a machine bolt 71 holds it upon the upwardly extending edge of the casting—a continuation of the front wall 69, thus forming a strong and rigid connection. The members 65 and 67 are pivotally connected to the steering post after the manner described for Figs. 1, 2 and 3.

In order to constitute the device of Fig. 5 a vehicle of the seat type as well I provide the seat 72 rigidly secured as by screws or bolts upon the wooden standard 73 having a front edge at 74 adapted to contact the rear edge of the bracing and supporting member 67. The parts 73 and 67 are to be considered as being of the same thickness. A pair of oppositely disposed metallic plates 75 (only one being seen) are held, as by the bolts 76, upon the standard 73, these plates 75 extending forward and lying upon the opposite side faces of the member 67 and being secured there by a pair of bolts 77. In order to hold the seat in operative position and to provide an adjustment in up-and-down directions I bore a plurality of holes 78 through the member 67, the holes being suitably spaced apart, say half the distance between the bolts 77 as illustrated, whereby the seat may be held firmly in its operative position at various elevations.

When it is desired to change the device of Fig. 5 from a seat vehicle to a foot vehicle the bolts 77 may be removed and the seat laid aside. Or the bolts 76 may be removed and replaced with the seat in an up-and-down and out-of-the-way position as shown in dotted lines. For this purpose I add a hole 80 in the seat support which accommodates one of the bolts 76. The bolts 76 and 77 are provided with wing nuts to facilitate making the changes pointed out.

The steering post preferably slants rearward from bottom to top not only to provide more easy steering, but also to coöperate with the bracing member to form a direct pivotal connection between the two at a relatively high elevation, and also to bring the handle bars within easy control of the operator in a form of device employing a desirably relatively large front wheel, in which form his foot must necessarily be at some distance rearward of where the front wheel touches the ground.

It will be apparent to those skilled in the art that various changes may be made in details of construction and arrangement of the device as specifically illustrated and described without departing from the spirit of the invention, and I contemplate all such modifications and departures as are included within the scope of the appended claims.

I claim:

1. A vehicle of the class described comprising a steering post and a wheel operatively mounted therein, rear wheels, an intermediate member pivotally connected to the steering post and extending rearward and its rear end portion supported by the rear wheels, a bracing member secured to the intermediate member and extending upward therefrom and pivotally connected to the steering post at a higher elevation than the pivotal connection for the intermediate member, and a seat secured to said bracing member.

2. A vehicle of the class described comprising a steering post and a wheel operatively mounted therein, rear wheels, an intermediate member pivotally connected to the steering post and having a substantially horizontally disposed foot-rest portion extending rearward and its rear end portion supported by the rear wheels, a bracing member secured to the intermediate member and extending upward therefrom and pivotally connected to the steering post at a higher elevation than the pivotal connection for the intermediate member, and a seat adjustably secured to said bracing member.

3. A vehicle of the class described comprising a steering post and a wheel operatively mounted therein, rear wheels, an intermediate member pivotally connected to the steering post and having a substantially horizontally disposed foot-rest portion extending rearward and its rear end portion supported by the rear wheels, a bracing member secured to the intermediate member and extending upward therefrom and pivotally connected to the steering post at a higher elevation than the pivotal connection for the intermediate member, and a seat connected to said bracing member and mounted for movement out of its operative position to make room for the operator to stand upon said foot-rest portion.

4. A vehicle of the class described comprising a steering post and a wheel operatively mounted therein, rear wheels, an intermediate member pivotally connected to the steering post at a relatively low elevation and extending rearward, the rear end portion of said intermediate member being supported by the rear wheels, a bracing member having its lower end portion secured to the intermediate member at a forward portion thereof and having its upper end pivotally connected with the steering post at a relatively high elevation, and a rearwardly extending seat carried by said bracing member.

5. A vehicle of the class described comprising a steering post and a wheel operatively mounted therein, rear wheels, an intermediate member pivotally connected to the steering post at a relatively low elevation and extending rearward, the rear end portion of said intermediate member being supported by the rear wheels, a bracing member having its lower end portion secured to the intermediate member at a forward portion thereof and having its upper end pivotally connected with the steering post at a relatively high elevation, and a rearwardly extending seat carried by said bracing member and mounted for movement into an out-of-the-way position for use of the device as a foot vehicle.

6. A vehicle of the class described comprising a steering post and a wheel operatively mounted therein, rear wheels, an intermediate member pivotally connected to the steering post at a relatively low elevation and extending rearward, the rear end portion of said intermediate member being supported by the rear wheels, a bracing member having its lower end portion secured to the intermediate member at a forward portion thereof and having its upper end pivotally connected with the steering post at a relatively high elevation, a rearwardly extending seat device secured at its front end to said bracing member, and means for supporting the rearwardly extending portion of said seat device.

7. A vehicle of the class described comprising a steering post and a wheel operatively mounted therein, rear wheels, an intermediate member pivotally connected to the steering post at a relatively low elevation and extending rearward, the rear end portion of said intermediate member being supported by the rear wheels, a bracing member having its lower end portion secured to the intermediate member at a forward portion thereof and having its upper end pivotally connected with the steering post at a relatively high elevation, a rearwardly extending seat device secured at its front end to said bracing member, and means for supporting the rearwardly extending portion of said seat device, said means and said seat device being hingedly mounted to swing into an out-of-the-way position for use of the device as a foot vehicle.

8. A vehicle of the class described comprising a steering post and a wheel operatively mounted therein, rear wheels, an intermediate member pivotally connected to the steering post at a relatively low elevation and extending rearward, the rear end portion of said intermediate member being supported by the rear wheels, a bracing member having its lower end portion secured to the intermediate member at a forward portion thereof and having its upper end pivotally connected with the steering post at a relatively high elevation, a rearwardly extending seat device secured at its front end to said bracing member, and means for supporting the rearwardly extending portion of said seat device, said supporting means and said seat being mounted for folding upon each other in an out-of-the-way position for use of the device as a foot vehicle.

9. A vehicle of the class described comprising a steering post and a wheel operatively mounted therein, rear wheels, an intermediate member pivotally connected to the steering post at a relatively low elevation and extending rearward, the rear end portion of said intermediate member being supported by the rear wheels, a bracing member having its lower end portion secured to the intermediate member at a forward portion thereof and having its upper end pivotally connected with the steering post at a relatively high elevation, a rearwardly extending seat device secured at its front end to said bracing member, and means for supporting the rearwardly extending portion of said seat device, said supporting means including a rod pivotally mounted in a relatively low and forward part of the device whereby it may swing forward and lie substantially close to said bracing member.

10. A vehicle of the class described comprising a steering post and a wheel operatively mounted therein, rear wheels, an intermediate member pivotally connected to the steering post at a relatively low elevation and extending rearward, the rear end portion of said intermediate member being supported by the rear wheels, a bracing member having its lower end portion secured to the intermediate member at a forward portion thereof and having its upper end pivotally connected with the steering post at a relatively high elevation, a rearwardly extending seat device secured at its front end to said bracing member, and means for supporting the rearwardly extending portion of said seat device, said supporting means including a rod pivotally mounted in a relatively low and forward part of the device whereby it may swing forward and lie substantially close to said bracing member, said seat device being pivotally mounted on said rod and adapted to lie substantially close to said rod and to said bracing member when in said forward position.

11. A vehicle of the class described comprising a steering post and a wheel operatively mounted therein, rear wheels, an intermediate member including a foot rest part pivotally connected to the steering post and extending rearward and its rear end portion supported by the rear wheels, a bracing member secured to the intermediate member near its forward end and extending upward therefrom and pivotally connected to the steering post at a higher elevation than the pivotal connection for the intermediate member, and a seat secured to said bracing member with a readily separable connection whereby the seat may be readily removed out of its operative position.

12. A device of the character described comprising a steering member having a wheel operatively mounted therein, a relatively low rearwardly extending part constituting a foot rest, rear wheels supporting said foot-rest part, a seat-supporting member extending upwardly from the foot-rest portion, a seat attached to said seat supporting member, and a second supporting member for the seat, said second seat-supporting member being pivotally mounted whereby it may swing into an out-of-the-way position with said seat folded upon it to provide room for the foot of the operator when the device is used as a foot vehicle.

13. A vehicle of the class described comprising a steering post and a wheel operatively mounted therein, rear wheels, an intermediate member pivotally connected to the steering post and having a substantially horizontally disposed foot-rest portion extending rearward and its rear end portion supported by the rear wheels, and a seat device including a stanchion-like support mounted on the device for movement out of the normal operative horizontal position of the seat above the foot-rest portion into an up-and-down position with the seat and its support folded upon each other to make room for the operator to stand upon said foot-rest portion.

14. A vehicle of the class described comprising a steering post and a wheel operatively mounted therein, rear wheels, an intermediate member pivotally connected to the steering post and having a substantially horizontally disposed foot-rest portion extending rearward and its rear end portion supported by the rear wheels, a bracing member secured to the intermediate member and extending upward therefrom and pivotally connected to the steering post at a higher elevation than the pivotal connection for the intermediate member, said bracing member comprising two bars spaced apart to provide a way between them, a seat device having its forward end projecting into said way, means for holding said forward end at various elevations on said bracing member, a stanchion-like support adjustably mounted on the seat at the upper end of the support and pivotally mounted at a relatively low part of the device at its lower end whereby it may swing forward and lie substantially parallel to said bracing member, the mounting of the seat being such that the seat may lie in folded relation to said support, and readily releasable means for holding the seat and said support in said folded position.

LUTHER JOHNS.